United States Patent [19]

Kimball

[11] Patent Number: 4,605,242
[45] Date of Patent: Aug. 12, 1986

[54] SUPPORT FOR A BICYCLE AND RIDER

[76] Inventor: James F. Kimball, 83617 Rattlesnake Rd., Dexter, Oreg. 97431

[21] Appl. No.: 788,960

[22] Filed: Oct. 18, 1985

Related U.S. Application Data

[62] Division of Ser. No. 571,942, Jan. 19, 1984, Pat. No. 4,563,017.

[51] Int. Cl.$^4$ ............................................. B62H 1/08
[52] U.S. Cl. .................................................. 280/294
[58] Field of Search ............... 280/294, 293; 74/594.4, 74/594.5

[56] References Cited
FOREIGN PATENT DOCUMENTS

| 475359 | 4/1929 | Fed. Rep. of Germany | 280/294 |
| Ad.35782 | 2/1930 | France | 280/293 |
| 1516 | of 1898 | United Kingdom | 280/294 |
| 284950 | 2/1928 | United Kingdom | 280/294 |

Primary Examiner—John A. Pekar
Attorney, Agent, or Firm—James D. Givnan, Jr.

[57] ABSTRACT

A combination bicycle pedal and stand assembly the latter including an extendable arm actuated to an operative, ground engaging position by a foot operated trigger. Motion translation means imparts downward swinging movement to the arm to position same in an over center operative position while resilient means biases the arm upwardly to a stowed position. The pedal and stand combination may support both the rider and bicycle during momentary traffic stops.

6 Claims, 10 Drawing Figures

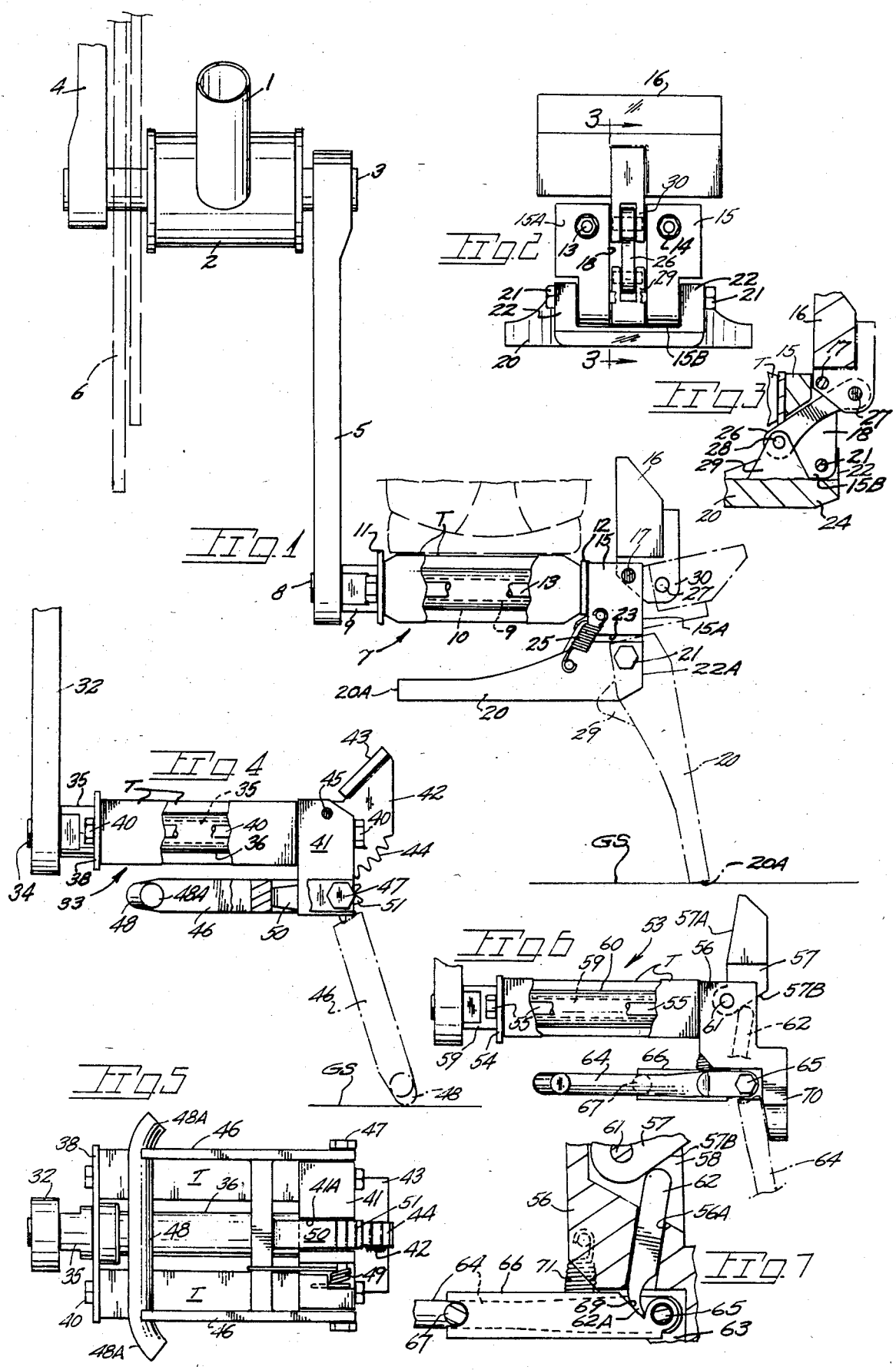

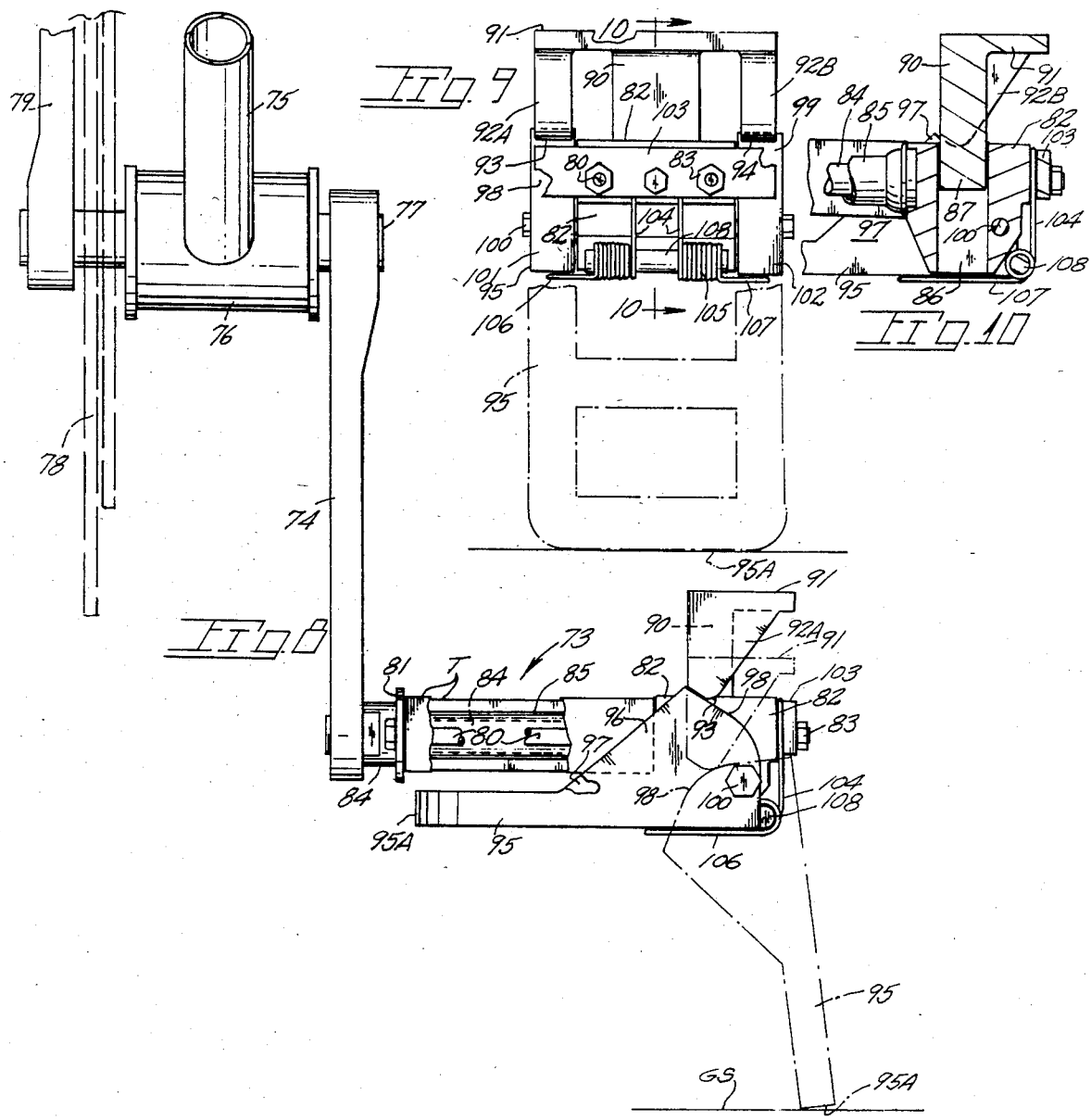

SUPPORT FOR A BICYCLE AND RIDER

This is a division of application Ser. No. 571,942 filed Jan. 19, 1984, now U.S. Pat. No. 4,563,017.

BACKGROUND OF THE INVENTION

The present invention pertains generally to stands which support two wheeled vehicles in an upright position.

The prior art discloses various pedal mounted bicycle stands which serve to support a parked bicycle and which, for the most part, require the operator to be dismounted for stand operation. A further drawback to known pedal attached stands are their complexity, weight and their not being compatible with current pedal structure. Such stands are not intended for or capable of use during riding of the bicycle. The known pedal mounted stands are disclosed in U.S. Pat. Nos. 654,245; 626,697; 626,693; 644,074; 444,258.

SUMMARY OF THE PRESENT INVENTION

The present invention is embodied in a bicycle stand for use during riding of the bicycle to support both the bicycle and rider during momentary steops.

During bicycle operation the rider typically must partially dismount when the bicycle is stopped to support the bicycle. Such dismounting and re-mounting entails a certain amount of inconvenience, particularly to those who use a bicycle in high traffic areas. Further, re-mounting on the bicycle seat delays acceleration of the bicycle as peddling of a multi-speed bicycle normally occurs after the rider is seated in place on the bicycle. Dismounting and re-mounting is particularly inconvenient to those riding multi-speed bicycles who are somewhat less than the optimum height for the bicycle being ridden.

The present stand includes a pedal mounted base which is located outboard of the pedal proper. Swingably carried by the base is a ground engageable arm. A foot operated member on the base serves to displace the arm downwardly in a positive manner and hold same fully extended in place until ground engagement whereat the arm is held in place against retraction by the ground surface. Retraction of the arm occurs automatically upon balanceing of the bicycle and the pedal being lifted during initial pedal movement.

Important objectives include the provision of a bicycle support which permits the rider to remain seated in place on the bicycle during momentary stops at signals or stop signs; the provision of a bicycle support which is of positive action to at all times indicate to the rider the extended or retracted position of the support; the provision of a support of lightweight, durable construction which is readily attachable to the bicycle and compatible with current pedal construction.

BRIEF DESCRIPTION OF THE DRAWINGS

In the accompanying drawings:

FIG. 1 is a fragmentary elevational view of a bicycle frame with the present invention in place on a pedal arm;

FIG. 2 is an end elevational view taken from the right side of FIG. 1;

FIG. 3 is a vertical sectional view taken along line 3—3 of FIG. 2;

FIG. 4 is a view similar to FIG. 1 but showing a modified form of the invention;

FIG. 5 is a bottom plan view of FIG. 4;

FIG. 6 is a fragmentary front elevational view of a further modification of the present invention;

FIG. 7 is an enlarged fragmentary view of the modification shown in FIG. 6;

FIG. 8 is a view similar to FIG. 1 but showing a still further modified form of the invention;

FIG. 9 is an end elevational view taken from the right side of FIG. 8; and

FIG. 10 is a vertical sectional view taken along line 10—10 of FIG. 9.

DETAILED DESCRIPTION OF THE PREFERRED EMBODIMENTS

With continuing attention to the drawings wherein applied reference numerals indicate parts hereinafter similarly identified, the reference numeral 1 indicates a rearwardly inclined tubular bicycle frame component which typically terminates at a bearing housing 2 in which is journalled a pedal shaft 3.

Pedal arms at 4 and 5 are mounted at the shaft ends while a drive sprocket is indicated at 6. The distal end of each pedal arm carries a pedal assembly generally as at 7 attached in the usual manner as by a threaded stub shaft 8 integral with a spindle 9 on which remaining pedal structure is rotatably carried by a tubular spindle housing 10. The pedal includes tread members T disposed between inner and outer pedal end plates 11 and 12. The tread members may be metal or rubber. A pair of bolt members as at 13 extend intermediate the pedal end plates and extend beyond outer end plate 12 to attach a later described base. The pedal structure departs from known pedal structure by the addition of extended bolt members 13.

A base 15 of a stand assembly is supported outboard of the pedal proper by the bolt members 13 which terminate in a recessed manner adjacent an outer wall 15A of the base and receive nut elements 14.

A foot actuated trigger at 16 is pivotally mounted on base 15 by a pivot pin 17 for trigger movement about an axis transverse to the pedal spindle. The base is bifurcated at 18 to receive the trigger.

An arm at 20 is carried below the pedal treads and includes a ground contacting edge 20A which is preferably of a length greater than the pedal width for purposes of adequate stability. A bolt 21 passes through arm ends 22 to pivotally attach same to the base. The arm ends have end surfaces at 22A which engage shoulders 23 formed on the base which function as limit stops for downward and outward arm travel. For arm strength the proximal end of the arm has a web 24 thereacross. Upward arm movement, as biased by a spring 25, is limited by downward directed base projections 15B which are abutted by web 24 of the raised arm per FIG. 3.

Motion translating means includes a link 26 pivotally coupled at 27 to a clevis 30 on the foot actuated trigger 16 and at 28 to a pedestal 29 carried by arm web 24.

In use the trigger is depressed by the rider's foot resulting in arm 20 moving downwardly and ultimately into ground engagement as the bicycle approaches a dead stop. Slight leaning of the rider toward the arm equipped pedal, upon stopping or just prior to, brings the lowered arm into contact with a ground surface GS where it will remain in an over center locked condition supporting the rider and bicycle until the rider commences pedalling. Getting underway, the rider may lean to return the bicycle to a balanced condition to provide ground clearance whereupon the arm is retracted by spring 25.

In FIG. 4, a modified support is shown carried by a bicycle pedal arm 32. A pedal assembly is indicated generally at 33 and is connected to the pedal arm by a threaded stub shaft 34 on pedal spindle 35 which includes a boss portion provided with tool receiving flats. The spindle extends the length of the pedal with ends of the spindle serving to rotatably mount a tubular spindle housing 36. The spindle housing terminates in seated engagement within a later described pedal supported base. Treads at T are attached to a pedal end member 38 and the later described base by bolt and nut elements as at 40 passing through an end plate 39. Accordingly, pedal 33 may rotate about the spindle axis in the manner of a conventional bicycle pedal.

A base 41 of a stand assembly is bifurcated at 51A to receive a trigger 42 having a foot plate 43 actuated by foot pressure with the trigger having gear teeth 44 formed along its lower portion. A pivot pin 45 in the base permits trigger movement about an axis transverse to the pedal spindle.

An arm 46 is swingably mounted on base 41 by means of a bolt serving as a pivot pin 47. Arm 46 may be of welded or cast construction having a skid 48 extending thereacross with upturned end segments 48A to prevent forceful impacting of the arm against an obstruction on ground surface GS. Said arm is equipped with a gear component 50 which terminates outwardly in arcuately disposed gear teeth 51 which are in driven mesh with gear teeth 44 on trigger 42. A coil spring 49 biases arm 46 to a raised or stowed position in the absence of foot pressure on the trigger.

In use, as the cyclist approaches a stop, trigger 42 is depressed to lower arn 46 to the extended broken line position and upon the bicycle coming to a stop, or just prior thereto, the rider simply leans toward the stand equipped pedal resulting in the extended stand arm coming into contact with the ground surface to retain the bicycle and rider in an upright position. Downward arm extension is limited by the extend of gear teeth 44 and 51. Preferably, pedal arm 32 is slightly rearwardly inclined so as to forwardly incline the upper pedal arm to facilitate starting of the bicycle.

A further modified form of the invention is seen in FIGS. 6 and 7 wherein a like pedal assembly generally at 53 is rotatably attached to a pedal arm in the manner described above with the earlier forms of the invention. Pedal treads at T each receive a bolt as at 55 which extends from a supporting end plate 54 lengthwise through each tread T and through a base 56 of a stand assembly to receive nut elements also in the manner earlier described. A pedal spindle and spindle housing are at 59 and 60.

Base 56 of the stand assembly has a central bifurcation 58 to receive a trigger 57 carried by a pivot pin 61.

Motion translating means includes the trigger 57 having a foot pad 57A. A cam surface 57B on the trigger acts on a pin 62 slidably confined within a base bore 56A. Foot pressure on a trigger foot pad 57A drives pin 62 downwardly to act on and extend a ground engageable arm 64. Disposed within a central bifurcation 63 of the base is an arm lever component 66 integral with an arm cross member 67. Downward movement of detent 62 causes a pin end 62A to act on a detent biased surface 69 for extension of arm 64 about an arm attaching bolt member 65.

A base extension at 70 constitutes an arm limit stop. Upward arm movement is by a base mounted spring 71. The lower sides of the base are inwardly recessed to receive the proximal ends of U-shaped arm 64 swingably held in place by bolt 65 passing through the arm ends and the lower bifurcated portion of the base. The arm abuts the underside of the base at its upper limit of travel.

A still further modified form of the invention is shown in FIGS. 8 through 10 wherein a pedal assembly indicated generally at 73 is attached to a pedal arm 74 of a bicycle having a frame member 75, a bearing housing 76, a pedal shaft 77, a driving sprocket 78 and a remaining pedal arm 79.

Pedal treads at T each receive a bolt as at 80 which extends from a pedal end plate 81 lengthwise through their respective tread and through a base 82 securing the latter in place to the tread ends by nut elements 83. A pedal spindle at 84 and a spindle housing at 85 serve to rotationally support the treads and base 82 on the end of pedal arm 74. The spindle is provided with tool receiving flats in the customary manner. Per FIG. 10, the spindle housing 85 seats in a recessed manner in an inner wall surface of base 82 of a stand assembly.

Base 82 has a guideway 86 formed therein in which a guide block 87 rides in an upright manner. Guide block 87 is integral with a trigger 90 having a foot pad at 91. At the sides of the trigger are cam means shown as depending cam structures 92A–92B each terminating downwardly in arm actuating cams 93–94.

Base 82 swingably mounts an arm 95 having a ground surface engaging end 95A. The arm includes an upwardly projecting pair of walls at 96–97 each having a cam means engaged surface 98–99 which extends outwardly and downwardly. Cam means engaged surfaces 98–99 are offset from an arm mounting pivot shaft 100, shown as a bolt, which additionally extend through base 82. Downward rotation of arm 95 is limited by arm surfaces 101–102 coming into abutment with a base mounted plate 103 which additionally serves to confine a loop segment 104 of a coil spring 105. End segments 106–107 of the coil spring are disposed below the sides of arm 95 to bias same to a raised or retracted position. A spring reinforcing pin is at 108.

In use, the trigger is depressed by the rider's foot to fully extend arm 95 to the broken line, ground engaging position as the bicycle comes to a stop. The lowermost pedal can be so positioned during movement of the bicycle as the bicycle rear wheel hub is in overrunning relationship with the bicycle rear wheel axle. Leaning of the rider toward the stand equipped pedal results in arm 95 coming into contact with the ground.

The present pedal assemblies disclosed may be used in combination with pedals having block shaped rubber tread components or pedals having metallic tread components such as those pedals referred to as "rattrap" pedals and having the capability of foot release for operation of the present stand assembly trigger The length of the stand assembly arm is such that when the arm is fully extended and in ground contact the bicycle and rider will be supported with the lowermost pedal arm in the "5 o'clock" position resulting in the uppermost pedal arm being forwardly inclined in the "1 o'clock" position for convenient application of starting force to the upper pedal.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A pedal and stand combination for a two-wheeled vehicle to support same and a rider during momentary stops, said combination comprising, a pedal assembly including treads and adapted at one end for attachment to the vehicle, a stand assembly including, a base in place on the remaining end of said pedal, means extending through said treads and securing said base to said pedal assembly, an arm pivotally mounted at one end to said base and having a ground engageable end, foot actuated trigger means rotatably mounted on said base for downward rotation about a horizontal axis, said foot actuated trigger means normally projecting upwardly from the base when the stand assembly is inoperative, motion translation means interposed between said trigger means and said arm and urging said arm downwardly to an extended position during movement of said trigger means, and means acting on said arm to bias same toward a raised stowed position, said arm urging said foot actuated trigger means toward a raised position.

2. The combination claimed in claim 1 wherein said motion translating means includes meshed gear teeth on said trigger means and said arm.

3. The combination claimed in claim 2 wherein downward arm travel is limited by said gear teeth.

4. The combination claimed in claim 1 wherein said motion translating means includes a pin slidably carried by said base.

5. The combination claimed in claim 4 wherein said arm includes a lever component engaged by said pin during doward movement of the arm.

6. The combination claimed in claim 5 wherein said base includes a downward extension which serves as a limit stop for the arm.

* * * * *